Nov. 14, 1961 A. M. URIBE 3,008,370
PHOTOMETRIC APPARATUS
Filed July 21, 1958
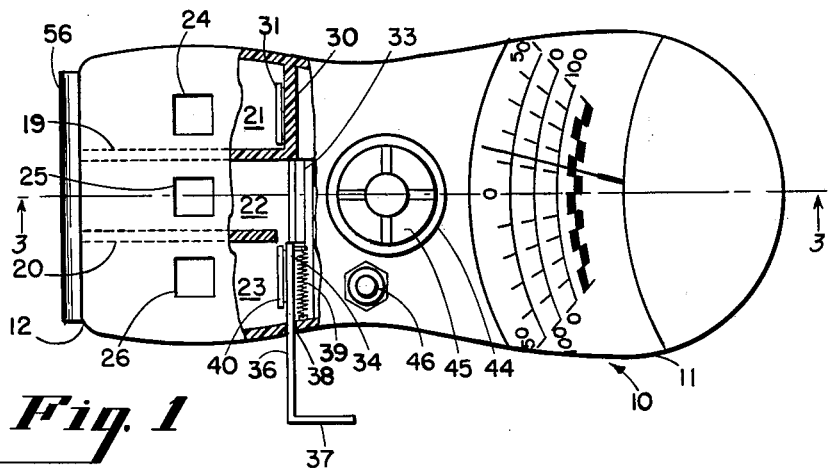
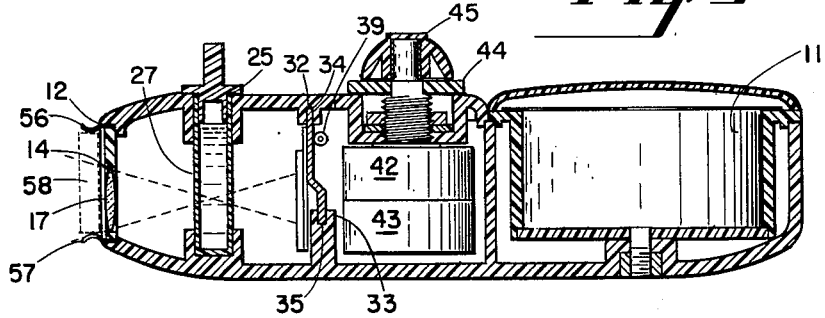
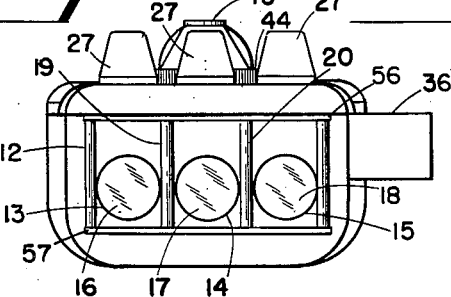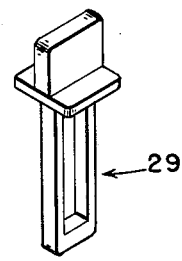
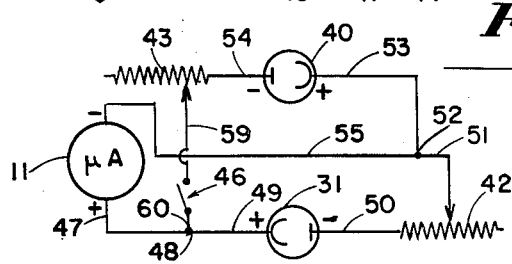
INVENTOR.
ANTONIO M. URIBE
BY J. F. Cuneo
ATTORNEY United States Patent Office 3,008,370
Patented Nov. 14, 1961

3,008,370
PHOTOMETRIC APPARATUS
Antonio M. Uribe, West Covina, Calif.
Filed July 21, 1958, Ser. No. 749,818
6 Claims. (Cl. 88—14)

This invention relates to photometric apparatus and in particular to a photo-colorimeter capable of rapidly and accurately measuring the difference between the light absorbing property of an unknown light absorbing medium and that of a standard light absorbing medium, when these are placed in the path of a beam of light of sufficient intensity to operate the selfenergizing photosensitive elements of the apparatus. The instrument can also be used for quantitatively determining the percentage of a specific ingredient in a liquid or fluid by restricting the incoming light to light of a given wave length.

The majority of photometers that are capable of accurately determining the light absorbing property of a paricular light absorbing medium are generally complicated and expensive. Many of these instruments require a self contained light source, while some instruments are designed and intended to operate only on light of a specific wave length or on a light wave length band that is extremely narrow. This necessitates equipping the instrument with a special light source. Many of the existing photometers also require and include an adequate source of electrical energy such as a battery or a transformer to supply the power required to operate the self-contained light source as well as the other electrical elements used in the device. The addition of such a self-contained power source adds considerable weight to the instrument and limits its flexibility of operation; errors can also result from the fluctuations of the current that is put out by the source.

A purpose of this invention is to provide an accurate, compact, portable, inexpensive and simple self energizing instrument that may be employed as a photometer, colorimeter, hemoglobinometer, or turbidity meter, and can also be used as a quantitative photometer; the instrument being capable of quickly determining the difference between the emergent radiation of a light beam passing through a standard specimen and an unknown solution.

Another purpose of my invention is to provide a differential photometer that does not require a self-contained light source, but will satisfactorily operate any external light source that is of sufficient intensity, and further, does not require any source of electrical energy such as a battery or a transformer.

I have provided by my invention a simple, relatively inexpensive and extremely accurate differential type of photometer that does not require a self-contained light source, requires no source of electrical energy such as a battery or transformer, and will normally operate on a light source that is externally available. Any light source of sufficient intensity to cause the selfenergizing photoelectric cells in the instrument to operate satisfactorily, may be utilized; the light source may be daytime skylight, sunlight or external sources of artificial light. Since the light gathering elements of the instrument are grouped closely together, there is little or no variation between the quantity or quality of the light that strikes the various light gathering elements when these are directed toward the source of illumination.

To prevent any side interference from affecting each beam of light that is being transmitted by the light gathering and focusing elements mounted in the light receiving portion of the instrument, the internal portion of the instrument adjoining the light receiving and focusing elements is provided with a partition or partitions that separate the internal portion of the instrument into elongated passageways or compartments, the number of partitions depending on the number of light gathering elements in the instrument. These light gathering elements are generally lenses that are capable of bringing the beam of light striking the outside of the lens to a focus at some predetermined position along the respective passageway. The apparatus is provided with suitable means for supporting light absorbing mediums, either in the form of a solution in a suitable container, or a standard glass filter, each light absorbing medium being preferably located at the focal point of its respective lens. Self energizing photocells, usually two in number are located at or near the inner end of the respective passageways, all of the photocells being placed at an equal distance from the focal point of their respective lens to avoid any variation in the size of the beam of light that will strike the photocell after it has passed through the light absorbing mediums.

The photocells are electrically connected to a highly sensitive electrical indicating instrument that is mounted in the photometer case, such as a micro-ammeter or a very sensitive galvanometer. The electrical connection is made in such a manner that any difference in the currents generated by each of the self energizing photocells will be quickly determined by reading the instrument; when the currents generated by the photocells are equal, the indicating instrument will show no deflection. The meter may be calibrated to read in any desired units. Each photocell is furnished with a suitable electrical current controlling means that is electrically connected between the respective photocell and the indicating instrument. This current controlling means may be a potentiometer or a variable resistor. By adjusting the electrical controlling means the operator can regulate the current output of each photocell independently whenever required. After both photocells have been adjusted to develop the same current, when the photocells are subjected to the emergent radiation from corresponding light absorbing mediums, one of the photocells is positioned to receive the emergent radiation from an unknown sample—any difference in the light absorbing properties of the unknown sample and the standard medium will be registered on the indicating instrument. The photometer is preferably provided with means for disconnecting the photocell that ordinarily is used to measure the light passing through an unknown sample, from the system, thereby leaving the first photoelectric cell alone in the meter circuit, in which case the instrument may be used, if desired, as a light meter in addition to its other uses. This permits the operator to set the value of the current developed by that photocell at any desired value and at the same time to ascertain whether the chosen light source that is to be used is of sufficient intensity to properly energize the photocells.

As previously mentioned the present device may be used as a photometer, colorimeter, hemoglobinometer or turbidity meter by simply selecting the proper standard and by providing suitable calibrations on the scale of the indicating instrument. By using a filter or filters, placed in the path of the light before it reaches the unknown specimen or the standard, the instrument may be converted into a quantative photometer.

The above and subsequent description will be more easily understood by referring to the accompanying drawings in which:

FIG. 1 is a top plan view of a preferred form of the photometric device, with a portion of the upper part of the case cut away to more clearly show the passageways and the position of the self-energizing photocells.

FIG. 2 is a front end elevation of the device showing the light gathering means located at the forward end of each compartment and also showing the filter retaining clips ahead of the light gathering means.

FIG. 3 is a cross sectional view taken on the line 3—3 of FIG. 1.

FIG. 4 is a isometric view of a cuvette body and lid which is used to contain either a standard solution or an unknown sample.

FIG. 5 is an isometric view of a glass filter support used to suspend the glass filters in the instrument when these are used in place of the standard solution.

FIG. 6 is a schematic wiring diagram showing the relationship of the various electrical components in the apparatus, to each other.

In FIG. 1 there is shown a preferred embodiment of the photometer which comprises a surrounding case 10 that is substantially longer than it is wide. Within the case there is mounted indicating instrument 11 which can be a micro-ammeter or a highly sensitive galvanometer. Meter 11 is preferably mounted near one end of the instrument case. The opposite end 12 of surrounding case 10 is closed and is preferably rectangular in outline. End 12 is provided with a plurality of circular openings, three in the photometer shown in the drawings, designated as 13, 14, and 15 into which are mounted lenses 16, 17 and 18 respectively. These lenses are preferably bi-convex, however, any other suitable form of lens may be used.

The enclosed portion of case 10 that extends inwardly from end 12, is divided by partitions 19 and 20, to form three passageways or compartments 21, 22, and 23. Partitions 19 and 20 extend from the top to the bottom of surrounding case 10. The proper lens focuses the light striking each lens at a point along its respective passageway. Partitions 19 and 20 prevent any light from passing from one passageway into another adjoining passageway. At the position corresponding to the location of the focal point of each lens in its respective passageway, the upper surface of case 10 is provided with supporting means in the form of openings 24, 25 and 26, adapted to receive and support either a cuvette 27 such as illustrated in FIG. 4, or a filter holder 29 such as shown in FIG. 5.

The rear end of compartment, or passageway 21 is closed by a partition 30, transverse to partition 19, and located a suitable distance from the focal point of lens 16. A first self-energizing photocell 31 is supported by partition 30. This photocell is of the type that does not require any external source of electrical energy to become activated, but is self-activated by the action of a light beam striking the surface of the photocell.

The rear end portions of compartments 22 and 23 are provided with an upper track 32 and a lower track 33 which engage operating portions 34 and 35 that are attached to the upper and lower edges of sliding member 36. Sliding member 36 is positioned in the instrument so that its surface, facing end portion 12, is the same distance from the focal points of the lenses 17 and 18 as partition 30 is from the focal point of lens 16. Sliding member 36 is provided with a handle 37 and the extension projects through slot 38 located in the side wall of surrounding case 10, adjoining passageway 23. The slide is of sufficient length to permit postioning the inner portion of slide 36 across the rear end of passageway 22. Sliding member 36 is held in its normal position across the rear of passageway 23, by means of a coil spring 39 that is secured at one end to the case, near slot 38 and at the other end to a spring retainer appropriately mounted on sliding member 36. In some instances it may be desirable to eliminate spring 39 entirely, thus leaving slide 36 in whatever position it has been placed by the operator.

A self-energizing photocell 40, is supported by sliding member 36. This photocell likewise does not require any external source of electrical energy to become activated, but is activated by the action of a beam of light striking its surface.

Since the current output of two similar photocells is seldom the same even though the photocells are placed in the path of identical light beams, the photometric device incorporates current controlling units 42 and 43, for example a potentiometer or a variable resistor, that is connected between the respective photocell and the meter. Controlling units 42 and 43 are preferably mounted in approximately the center of the instrument behind partition 30 and the partition that supports tracks 32 and 33. Controlling units 42 and 43 are provided with suitable shafts to which are secured independent knobs 44 and 45. These knobs are located above the upper surface of surrounding case 10 and are approximately in the center of the instrument between the photocells and the meter. The current output of each photocell 31 or 40 is individually adjusted by turning either knob 44 or 45 respectively as required. The photometer is also provided with a suitable switch 46 such as a depressable spring loaded switch or a toggle switch, that serves to disconnect photocell 40 from the circuit when it is desired to ascertain the response of photocell 31 alone, or when the instrument is being used to measure the intensity of a given source of light.

FIG. 6 shows schematically the wiring arrangement of my differential photometer. The positive terminal of meter 11 is connected by wire 47 to junction 48 which is in turn connected by wire 49 to the positive terminal of self-energizing photocell 31. Wire 50 connects the negative terminal of photocell 31 to the fixed terminal of potentiometer or variable resistor 42. The variable terminal of potentiometer 42 is connected by wire 51 to junction 52 and wire 55 connects junction 52 to the negative terminal of meter 11. Wire 53 connects junction 52 to the positive terminal of photocell 40; the negative terminal of photocell 40 being connected by wire 54 to the fixed terminal of potentiometer or variable resistor 43. The variable terminal of potentiometer 43 is connected by wire 59 to the pole of switch 46, preferably a single pole single throw switch. The other terminal of switch 46 is connected by wire 60 to junction 48.

The manner in which the device operates is as follows: Duplicate standard light absorbing mediums, such as a standard solution in a cuvette 27, or a standard glass filter mounted in filter holder 29, are inserted in sockets 24 and 26, thereby suspending the standards in passageways 21 and 23 respectively. The operator then points end portion 12 of the instrument toward the selected source of light and depresses switch 46, thereby leaving only photocell 31 and variable resistor or potentiometer 42 connected with meter 11. If the light source is sufficiently strong the indicator needle of meter 11 will show the desired degree of deflection or a greater deflection if the light is very powerful. The operator will now turn knob 44 adjusting the resistance of potentiometer 42 until the needle of the instrument shows the required scale reading; if after removing all possible resistance from the circuit, the indicator needle still does not show the required scale deflection, the operator must then select a more powerful light source before proceeding. When the indicating needle of the meter has been adjusted to give the desired deflection and it has been determined that the light source is adequate, the operator releases the button of switch 46, placing the currents from the two photocells in opposition to each other. Since the standards in front of photocells 31 and 40 are the same and the photocells are connected so that the current developed by one photocell will oppose that developed by the other, if the current generated by each photocell is the same, the indicating needle of the meter would in that case show no current flowing. Variations in the construction of photocells of the same type makes it difficult to obtain two photocells that would ordinarily generate the same current; likewise any slight variation in the light input reaching the light absorbing mediums makes it generally necessary to adjust the current developed by photocell 40 so that it will correspond to that developed by the already adjusted photocell 31. This is accomplished by adjusting the current output of cell 40 by turning knob 45 of current adjusting means 43 until the indicator needle of the meter shows that no current is flowing, in which case the current developed by each photocell is identical under existing conditions. When the current output of the two photocells has been so adjusted, the operator, having previously inserted an unknown sample in a cuvette 27 and placed the container in socket 25, now pushes slide 36 inwardly until photocell 40 is at the rear of compartment or passageway 22, where it will receive the emergent light after it has passed through the unknown sample. If the indicator needle does not shift from its former position, it would mean that the unknown sample possessed the same light absorbing power as the standards. Any difference between the light absorbing power of the standards and that of the unknown sample would be immediately indicated on the proper scale by the position of the needle of meter 11.

If desired the instrument could be made with only two passageways, in which case sliding member 36 would not be used and photocell 40 would be supported at the end of its compartment in the same manner as photocell 31 is supported. In this modification the operator would first standardize the photocells against each other as previously described, and would then remove the standard from in front of photocell 40 and replace it with the container holding the unknown sample, otherwise the operation would be the same as set forth above.

Should it be desirable to operate the instrument at some specific wave length of light, the operator may insert an appropriate glass filter 58, shown by the dotted lines in FIG. 3, between spring clips 56 and 57 located at the forward end of the instrument; the proper filter would screen out all unwanted wave lengths of light and prevent light of the screened out wave lengths from reaching the photocells. While the filter has been shown supported at the forward portion of the instrument for convenience of illustration, it is to be understood that a filter or filters could be inserted at any position between the light source and the photocells.

Although the illustrated embodiment shows an instrument that includes only two photocells and three compartments, it is contemplated that an instrument could be made having a plurality of compartments, and that each of the photocells could be replaced by a separate plurality of photocells suitably mounted so that any one of the photocells in a given plurality could be switched into the circuit by means of a selector switch.

If it should be desired to use the photometric apparatus as a quality control instrument to ascertain whether or not an unknown light absorbing medium falls between established limits the operation is as follows: The operator depresses switch 46 disconnecting photocell 40 from the circuit and without using any light absorbing medium in socket 24, regulates the current output of photocell 31 by means of potentiometer 42 until the meter shows the desired deflection. Switch 46 is then released again placing photocell 40 in opposition to photocell 31. Without using any light absorbing medium in socket 26, the current output of photocell 40 is adjusted by turning knob 45 of potentiometer 43 until meter 11 shows that no current is flowing and that the current generated by each of the photocells is equal.

A glass filter or a known specimen having the minimum acceptable absorption is placed in socket 24 of the instrument. The operator now depresses switch 46 again leaving only photocell 31 in the circuit with the meter. The meter will show a deflection that will be less than the maximum deflection obtained without any light absorbing medium in the path of the light beam; this reading is recorded. The switch is then released and a second filter or known light absorbing specimen, having the maximum acceptable absorption power is inserted in socket 26. The meter would now indicate a value somewhere between the first recorded reading and zero depending on the absorptive power of the second filter or specimen; this reading is also recorded. An unknown sample is inserted in socket 25 and photocell 40 is shifted so that it will receive the emergent radiation from the unknown sample. Depending on the absorptive power of the unknown sample, the needle of the meter may show a negative deflection, that is below zero, it may show a deflection somewhere between zero and the lower reading recorded when the two photocells and the maximum and minimum light absorbing samples are checked, or it may show a reading falling somewhere between the maximum and minimum recorded values. Only an unknown sample giving a reading falling in the last category would possess acceptable light absorbing properties, all other samples would be rejected.

While I have described one preferred embodiment of the present invention in detail referring to the accompanying drawings, it is to be understood and noted that various changes as to form, use of materials, types and number of elements, and the arrangement of parts as indicated in portions of the specification, may be made without departing from the spirit and scope of the present invention, as set forth in the appended claims.

I claim:

1. Photoelectric apparatus in the nature of a differential photometer, colorimeter, hemoglobinometer and turbidity meter comprising: an electrical indicating meter; a first self-energizing photoelectric cell; a first means for directing a beam of light from an external, independent light source toward said first photoelectric cell; a second self energizing photoelectric cell; a second means for directing a beam of light from said light source toward the second photoelectric cell, said first and second photoelectric cells being electrically connected to said indicating meter in such a manner that the positive pole of the first photoelectric cell is connected directly to the negative pole of the indicating meter, said positive pole of the first photoelectric cell being also connected to one terminal of a first variable electric current controlling means, the other terminal of said first variable electric current controlling means being connected to the negative pole of the second photoelectric cell, the negative pole of the first photoelectric cell being connected to one terminal of a second variable electric current controlling means, the other terminal of the second variable electric current controlling means being connected to the positive pole of the second photoelectric cell and also to the positive pole of the indicating meter, whereby the electrical current output of the two photocells oppose each other; switch means to selectively disconnect one photoelectric cell from the electrical indicating meter when the switch is in one position and to place the currents from the two photoelectric cells in opposition to each other when in the other position; means for interposing a first translucent body between the first light directing means and the first photoelectric cell; and means for interposing a second translucent body for examination between said second light directing means and said second photoelectric cell.

2. Photometric apparatus in the nature of a differential photometer, colorimeter, hemoglobinometer and turbidity meter comprising: a surrounding case, one end portion of said case being divided into compartments extending into the case, the outer end of each compartment being provided with an opening; a light directing means in each of said openings adapted to focus a beam of light from an external, independent light source, at a position along its respective compartment; a first self-energizing photoelectric cell supported in a first compartment, positioned to receive the beam of light being directed by the light directing means at the opening of said first compartment; a second self-energizing photoelectric cell supported in a second compartment and positioned to receive the beam of light being directed by the light directing means at the opening of said second compartment; an electrical indicating meter, said first and second photoelectric cells being electrically connected to said meter and to each other in such a manner that the positive pole of the first photoelectric cell is connected directly to the negative terminal of the indicating meter, said positive pole of the first photoelectric cell being also connected to one terminal of a first variable electric current controlling means, the other terminal of said first variable electric current controlling means being connected to the negative pole of the second photoelectric cell, the negative pole of the first photoelectric cell being connected to one terminal of a second variable electric current controlling means, the other terminal of said second variable electric current controlling means being connected to the positive pole of the second photoelectric cell and also to the positive terminal of said indicating meter, whereby the currents developed by the two photocells are in opposition to each other; switch means to selectively disconnect one photoelectric cell from the indicating meter when the switch is in one position, and to place the currents developed by the photoelectric cells in opposition when in the other position; and means adapted to interpose a translucent body at a position in each of said compartments between the respective light directing means and the respective photoelectric cell.

3. Photometric apparatus in the nature of a differential photometer, colorimeter, hemoglobinometer and turbidity meter comprising: a surrounding case, one end portion of said case being divided into three compartments extending inwardly into said case the outer end portions of each of said compartments being provided with an opening; a light directing means in each of said openings adapted to focus a beam of light from an external, independent light source, at a position along its respective compartment; a first self-energizing photocell supported in a first compartment and positioned to receive the beam of light directed by the light directing means at the end of said first compartment; a second photoelectric cell supported on a sliding member adapted to slide across the rear end portion of the second and third compartments and position said second photoelectric cell so that it will receive the beam of light directed by the light directing means of each respective compartment when said second photoelectric cell is positioned in that compartment; an electrical indicating meter, said first and second photoelectric cells being electrically connected to said meter and to each other in such a manner that the currents developed by the two photoelectric cells are in opposition to each other; and means adapted to interpose translucent bodies in each of said compartments at substantially the respective point of focus between the respective light directing means and the respective photocell when a photoelectric cell is located within that compartment.

4. Photometric apparatus according to claim 3 wherein the positive pole of the first photoelectric cell is connected directly to the negative terminal of the indicating meter, said positive pole of the first photoelectric cell being also connected to one terminal of a variable electric current controlling means, the other terminal of said variable electric current controlling means being connected to the negative pole of the second photoelectric cell, the negative pole of the first photoeletric cell being connected directly to the positive pole of the second photoelectric cell and also to the positive terminal of the indicating meter.

5. Photometric apparatus in the nature of a differential photometer, colorimeter, hemoglobinometer and turbidity meter comprising; a surrounding case, one end portion of said case being divided into three compartments extending inwardly into said case, the outer end portions of each of said compartments being provided with an opening; a light directing means in each of said openings adapted to focus a beam of light from an external, independent light source, at a position along its respective compartment; a first self-energizing photoelectric cell supported in a first compartment and positioned to receive the beam of light directed by the light directing means at the end of the first compartment; a second photoelectric cell supported on a sliding member, adapted to slide across the rear end portions of the second and third compartments and to position said second photoelectric cell so that it will receive the beam of light directed by the light directing means in each respective compartment when said second photoelectric cell is positioned in that compartment; an electrical indicating meter, said first and second photoelectric cells being electrically connected to said meter and to each other in such a manner that the positive pole of the first photoelectric cell is connected directly to the negative terminal of the indicating meter, said positive pole of the first photoelectric cell being also connected to one terminal of a first variable electric current controlling means, the other terminal of said first variable electrical current controlling means being connected to the negative pole of the second photoelectric cell, the negative pole of the first photoelectric cell being connected to one terminal of a second variable electric current controlling means, the other terminal of said second variable electric current controlling means being connected to the positive pole of the second photoelectric cell and also to the positive terminal of said indicating meter, whereby the currents generated by each of the two photoelectric cells are in opposition to each other; and means adapted to interpose translucent bodies in each of said compartments at substantially the respective point of focus between the respective light directing means and the respective photocell when the photocell is located within that compartment.

6. Photometric apparatus in the nature of a differential photometer, colorimeter, hemoglobinometer and turbidity meter comprising: a surrounding case, one end portion of said case being divided into three compartments extending inwardly into said case, the outer end portions of each of said compartments being provided with an opening; a light directing means in each of said openings adapted to focus a beam of light from an external independent light source, at a position along its respective compartment; a first self-energizing photoelectric cell supported in a first compartment and positioned to receive the beam of light directed by the light directing means at the end of the first compartment; a second photoelectric cell supported on a sliding member, adapted to slide across the rear end portions of the second and third compartments and to position said second photoelectric cell so that it will receive the beam of light directed by the light directing means in each respective compartment when said second photoelectric cell is positioned in that compartment; an electrical indicating meter, said first and second photoelectric cells being electrically connected to said meter and to each other in such a manner that the positive pole of the first photoelectric cell is connected directly to the negative terminal of the indicating meter, said positive pole of the first photoelectric cell being also connected to one terminal of a first variable electric current controlling means, the other terminal of said first variable electrical current controlling means being connected to the negative pole of the second photoelectric cell, the negative pole of the first photoelectric cell being connected to one terminal of a second variable electric current controlling means, the other terminal of said second variable electric current controlling means being connected to the positive pole of the second photoelectric cell and also to the positive terminal of said indicating meter, whereby the currents generated by each of the two photoelectric cells are in opposition to each other; means adapted to interpose translucent bodies in each of said compartments between the respective light directing means and the respective photocell when the photocell is located within that compartment; and switch means adapted to selectively disconnect one photoelectric cell from the indicating meter when the switch is in one position, and to place the currents developed by the photoelectric cells in opposition to each other when in the other position.

References Cited in the file of this patent

UNITED STATES PATENTS

| | | |
|---|---|---|
| 2,064,517 | Brice | Dec. 15, 1936 |
| 2,152,645 | Holven et al. | Apr. 4, 1939 |
| 2,232,169 | Diller | Feb. 18, 1941 |
| 2,273,356 | Holven et al. | Feb. 17, 1942 |
| 2,455,116 | Gittus | Nov. 30, 1948 |
| 2,898,802 | Ljungberg et al. | Aug. 11, 1959 |
| 2,922,301 | Phelan et al. | Jan. 26, 1960 |

FOREIGN PATENTS

| | | |
|---|---|---|
| 450,576 | Great Britain | July 21, 1936 |
| 305,644 | Switzerland | May 2, 1955 |

OTHER REFERENCES

"Colorimetry," Shurkus, June 1944, pages 25–27, 56, 58, 60 and 71, Radio News.

Nichols et al.: "A Photoelectric Titrimeter," Analytical Chemistry, vol. 22, No. 6, June 1950, pages 781–784.